June 15, 1954  A. A. HUBER  2,681,189
SPOOL HOLDING DEVICE
Filed Dec. 31, 1948
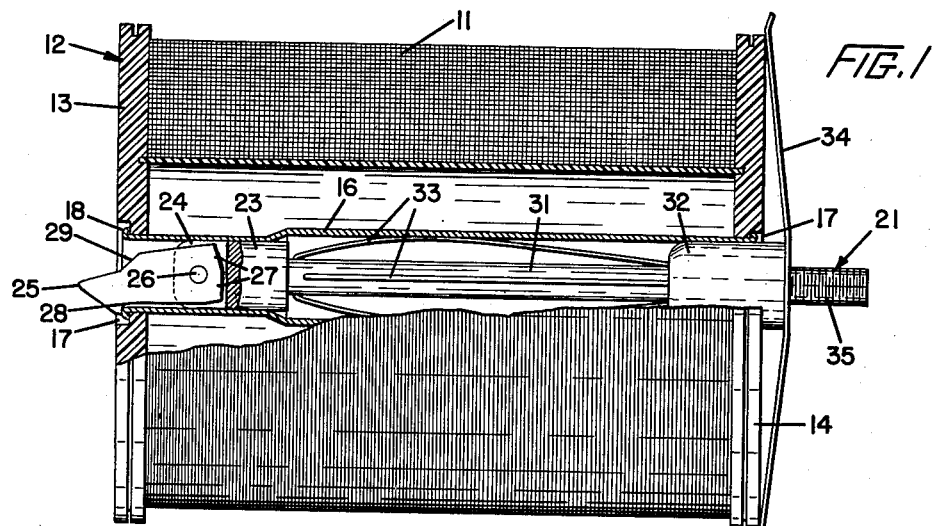
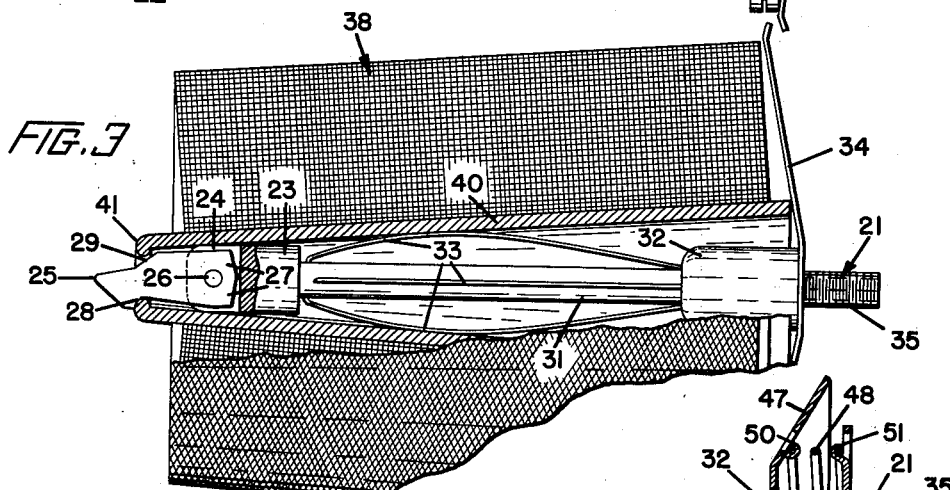
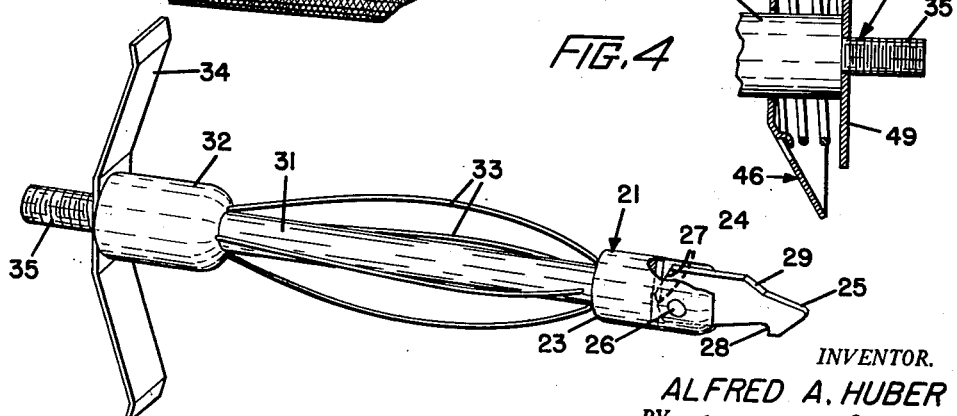
INVENTOR.
ALFRED A. HUBER
BY
Thomas S. Maynes
ATTORNEY Patented June 15, 1954

2,681,189

UNITED STATES PATENT OFFICE 2,681,189

SPOOL HOLDING DEVICE

Alfred A. Huber, Painesville, Ohio, assignor to Industrial Rayon Corporation, Cleveland, Ohio, a corporation of Delaware Application December 31, 1948, Serial No. 68,576

5 Claims. (Cl. 242—130)

This invention relates to a spool holding device, more particularly the invention is directed to an adjustable holding device that is adapted to hold and secure a spool from being pulled off its supporting arbor or spindle during a thread withdrawing operation.

In textile manufacturing thread, yarn, etc. is generally wound on spools, bobbins or cones which subsequently serve as supplies to warpers, looms, and knitting machines. The supplies are generally mounted in creels or on other types of spool and the like supporting apparatuses. Occasionally, upon the start of a withdrawing operation, the thread may become entangled with the spool flange and the spool may be pulled off its support; or the thread may be underwound on the spool, and the spool thus pulled off; or the arbor upon which the spool is positioned may protrude sufficiently from the spool core so as to interfere with a free withdrawal of the thread, and the thread become broken. Manifestly, where a great number of supply spools and the like are utilized in a spool supporting apparatus such as a creel, the aforesaid difficulties are multiplied to an extent so as to become a serious maintenance problem.

Means have been proposed to hold and to secure spools and the like on their arbors. Such means are spring retaining hooks that emerge from one end of a spool core; also spring backed steel balls, or expanding springs that frictionally bear against the inner surface of a spool core; a core hooking means such as a pivoted drop latch, or spring actuated latches, etc. None of the aforesaid means, however, have been found to be entirely satisfactory since they either fail to hold the spool onto the arbor over a prolonged period of operation, or they fail to keep the thread from catching onto a projecting portion of the arbor, or latch, or spring catch.

This invention advantageously provides for a spool and the like holding device that is adapted to securely hold a spool on its arbor and one that is also adjustable to the variations in length that is found in spools, etc. The holding device is adapted to also, advantageously, prevent a loose thread and the like from becoming entangled about a protruding arbor end or latch that emerges from the core of a spool.

The invention comprises a resilient spool abutting member against which the spool is thrust, and a latch that is adapted to hold onto the other end of the spool core. The resilient abutting member, advantageously, adjusts itself automatically to varying spool lengths effected in their manufacture. Further, a positive locking of the spool on its arbor is always assured by the thrust of the abutting member since it continually forces the spool against the latch. Also, the latch protruding portion, advantageously, avoids an ensnarement of a thread should it fall thereabout.

The invention is described in further detail in the following specification and in accompanying drawings, where:

Figure 1 represents a partial sectional elevation of a spool or the like package on a supporting arbor;

Figure 2 represents in perspective view a supporting arbor and associated holding device;

Figure 3 represents a partial sectional elevation of a cone package on a supporting arbor; and Figure 4 represents a partial rear section of the arbor showing a modification of the resilient abutting member.

Referring to the drawing, Figure 1 represents a spool or bobbin 10 having a supply of thread 11 positioned on a supporting arbor 21 which is adapted to be mounted in a creel or the like (not shown). The arbor 21 is generally supported from one end so that the thread 11 can be pulled off the free end of the spool 10 by a withdrawing apparatus such as a warper or loom.

Generally, spools comprise a core with end flanges. The core usually extends well into the flanges and is crimped over a recess portion, the recess being usually below the flat surface of the flange. The spool 10 is of such a general construction. The spool 10 has flanges 13 and 14 supported between an outer core 15 upon which the thread package is stored, and an inner core 16 which is placed about the arbor; the inner core ends 18 are crimped over the flange recesses 17 in flanges.

In placing the spool 10 on the arbor 21 the spool is placed about the arbor by first inserting the pivoted latch 25 into the spool core 16. The spool 10 is then further thrust about the arbor until the flange 14 contacts the resilient abutting member 34, and until the pivoted latch 25 protrudes through the flange 13. The latch 25 is then free to fall downwardly, by gravity, so that the hook 28 drops over the crimped portion 18 of the core 16. The spool, on being released, is urged forwardly by the resilient abutting member 34 against the hook 28 of the latch 25. The spool is thus firmly held in place between the latch and the resilient member.

The spool 10 is readily removed from its arbor 21, whenever necessary, by merely pushing it back against the resilient abutting member 34 and raising the latch 25 so that the hook 28 becomes free of the core end 18. The latch 25 is held in a raised position until the spool is withdrawn a sufficient distance so that the hook 28 rests on the inner surface of the spool core. Thereafter, the spool can be withdrawn entirely.

Figure 2 illustrates in greater detail in perspective view the supporting arbor 21 and its components. As shown, the supporting arbor 21 is comprised, generally, of a latch 25 pivotally mounted on the pin 26 in the slot 24 in the arbor head 23. The head 23 is positioned on the forward end of the arbor shaft 31. Spaced along about the periphery of the arbor shaft 31 are a plurality of expanding and spool centering springs 33. The forward ends of the springs 33 are imbedded into the surface of the shaft 31 while the opposite ends are inserted into grooves in the annular base 32, in which they slide when they are compressed. A resilient abutting member 34 is disposed on the threaded portion 35 between the annular base 32 and the mounting bracket of a creel or the like (not shown).

The resilient abutting member 34 may be a leaf spring, as shown, having opposite ends bent toward a yarn package such as a spool or cone. The spring 34 acts as a compressing device urging a package to the free end of the arbor, or against a spool retaining device such as the latch 25. The spring 34 can be modified and can have more than two extensions if desired. It may be readily clamped in position at the time of mounting the arbor 21 in a support such as a creel; or the spring can be locked in position by drawing up a nut on the thread portion 35.

Advantageously, the latch 25 is positioned within the end of the slotted arbor head 23. The arbor head slot 24 receives one end of the latch, and a pin 26 is adapted to be inserted through the head 23 and the latch 25. Further, the latch 25 is angularly shaped at its rear portion 27 so as to limit its rotation by contact with the end of slot 24.

The latch 25 may be actuated by gravity or by a positive means such as a spring. The spring is desirable where packages are positioned in planes other than where the latch is adapted to operate by gravity. As soon as the hook 28 of latch 25 is cleared by a flange or the end of a spool, it tends to drop into a locking position. Pressure exerted by the resilient member 34 against the spool forces the spool against the hook 28 of latch 25 to thereby maintain the spool in a locked position. The spool is thus held securely on the arbor and withstands being pulled off by substantially any manner.

Figure 3 illustrates a cone yarn package 38 on the supporting arbor 21. The method for placing and removing the cone package 38 on and off the arbor 21 is similar to that for placing and removing the spool 11 of Figure 1. Advantageously, the expanding springs 33 serve to align the cone 40 on the arbor 21 as well as spools where the dimensions do not vary greatly. Further, the resilient abutting means 34 is usually adapted without any modification to serve as a thrusting device against a cone to position the latch 25 to provide a package locking means.

Where cones are utilized, the latch 25 has a beveled portion 29 which is adapted to contact the curled cone tip 41 to force the latch 25 into a locking engagement with the cone tip. The resilient abutting member 34 is adapted to continually press the cone 40 against the hook 28 of the latch 25, to hold it securely from being pulled off.

In Figure 4 there is shown a further modification of the resilient abutting member. In this modification the resilient abutting member 46 comprises a cone shaped contact section 47 secured to a coiled spring 48 which is fastened to a retaining washer 49. The assembly 46 is adapted to be mounted on the threaded portion 35 of arbor 21. To insure that the component parts are held together a clip 50 in the cone shaped head 47 is adapted to hold one end of the coil spring 48 while clip 51 of the retaining washer 49 is adapted to hold the other end. This modification is adapted to center, on the supporting arbor, packages such as cones.

The supporting arbor with the holding device may find further usefulness in operations other than in creels, such as, for instance, in twisting or other yarn or thread transfer apparatuses. Also, the holding device is advantageous in securing to an arbor flangeless packages, as well as cones.

I claim:

1. In a holder for mounting packages of strandular material for over-end drawing, in combination, a stationarily held core upon which strandular material is wound, a stationary arbor adapted to be supported at one end for mounting said core, a resilient core aligning member positioned at the supported end of the arbor for exerting axial pressure against one end of said core, and a gravitationally actuated core retaining and locking device positioned at the unsupported end of said arbor, said retaining and locking device having a tapered end including a hook at its unsupported end for retaining and locking said core in position, said resilient core aligning member continuously axially urging said core into locking contact with said hook of said core retaining and locking device.

2. In a holder for mounting packages of strandular material for over-end drawing, in combination, a stationarily held core upon which strandular material is wound, a stationary arbor adapted to be supported at one end for mounting said core, a flared resilient core aligning member positioned at the supported end of the arbor for exerting axial pressure against one end of said core, and a gravitationally actuated core retaining and locking device positioned at the unsupported end of said arbor, said retaining and locking device having a tapered end including a hook at its unsupported end for retaining and locking said core in position, said flared resilient member continuously axially urging said core into locking contact with said hook of said gravitationally actuated core retaining and locking device.

3. In a holder for mounting packages of strandular material for over-end drawing, in combination, a stationarily held core upon which strandular material is wound, a stationary arbor adapted to be supported at one end for mounting said core, a resilient core aligning member comprising a flared leaf spring positioned at the supported end of the arbor for exerting axial pressure against one end of said core, and a pivoted gravitationally actuated core locking device positioned at the unsupported end of said arbor said locking device having a tapered end including a hook at its unsupported end for locking said core in position, said leaf spring continuously axially urging said core into contact with said hook of said core locking device to hold said core in position on said arbor.

4. In a holder for mounting packages of strandular material for over-end drawing, in combination, a stationarily held core upon which strandular material is wound, a stationary arbor adapted to be supported at one end for mounting said core, a resilient core aligning member positioned at the supported end of the arbor for exerting axial pressure against one end of said core, said resilient core aligning member being substantially frustum shaped, and a gravitationally actuated locking device positioned at the unsupported end of said arbor being adapted to hook onto the other end of said core, said locking device having a tapered end including a hook at its unsupported end for locking said core in position, said frustum-shaped member continuously axially urging said core into contact with said hook of the core locking device to hold the core in position on said arbor.

5. In a holder for mounting packages of strandular material for over-end drawing, in combination, a stationarily held core upon which strandular material is wound, a stationary arbor adapted to be supported at one end for mounting said core, a resilient core aligning device positioned at the supported end of the arbor for exerting axial pressure against one end of said core, said resilient core aligning device comprising a spring-urged substantially frustum-shaped member, and a gravitationally actuated core locking device positioned at the unsupported end of the arbor being adapted to hook onto the other end of said core, said core locking device having a tapered end including a hook at its unsupported end for locking said core in position, said spring-urged frustum-shaped member continuously axially urging said core into contact with said hook of the core locking device to hold the core in position on said arbor.

References Cited in the file of this patent

UNITED STATES PATENTS

| Number | Name | Date |
|---|---|---|
| 582,770 | Watson | May 18, 1897 |
| 1,119,428 | Hirsch et al. | Dec. 1, 1914 |
| 1,179,924 | Howell | Apr. 18, 1916 |
| 1,345,190 | Hutchison | June 29, 1920 |
| 1,364,249 | Cetwick | Jan. 4, 1921 |
| 1,713,277 | Goldberg et al. | May 14, 1929 |
| 1,724,034 | Mayer | Aug. 13, 1929 |
| 1,730,431 | Keefer | Oct. 8, 1929 |
| 2,095,518 | Casablancas | Oct. 12, 1937 |
| 2,372,424 | Ironside | Mar. 27, 1945 |

FOREIGN PATENTS

| Number | Country | Date |
|---|---|---|
| 336,536 | France | Mar. 11, 1904 |